United States Patent [19]
Conrads et al.

[11] Patent Number: 5,428,652
[45] Date of Patent: Jun. 27, 1995

[54] SECONDARY-SIDE RESIDUAL-HEAT REMOVAL SYSTEM FOR PRESSURIZED-WATER NUCLEAR REACTORS

[75] Inventors: Hermann-Josef Conrads, Herzogenaurach; Jürgen Czech, Oberreichenbach Herzogenaurach; Horst Göggelmann, Fürth; Werner Leidemann, Obermichelbach; Pius Mackert, Erlangen; Walter Merklein, Nürnberg; Rainer Schilling; Bernd Staehle, both of Erlangen; Wilfried Stoll, Nürnberg; Paul Uyttendaele, Erlangen, all of Germany

[73] Assignee: Siemens Aktiengesellschaft, Munich, Germany

[21] Appl. No.: 195,631

[22] Filed: Feb. 14, 1994

Related U.S. Application Data

[63] Continuation of PCT/DE 92/00664, filed Aug. 11, 1992.

[30] Foreign Application Priority Data

Aug. 12, 1991 [DE] Germany ............... 41 26 629.3

[51] Int. Cl.⁶ .................................................. G21C 15/18
[52] U.S. Cl. ................................................... 376/299
[58] Field of Search ............... 376/299, 298, 282, 283

[56] References Cited

U.S. PATENT DOCUMENTS

| | | | |
|---|---|---|---|
| 4,104,119 | 8/1978 | Schilling | 376/282 |
| 4,304,198 | 12/1981 | Stiefel | 376/282 |
| 4,407,773 | 10/1983 | Woudstra | 376/299 |
| 4,654,190 | 3/1987 | Schlonski | 376/298 |
| 4,765,946 | 8/1988 | Dagard et al. | 376/299 |

FOREIGN PATENT DOCUMENTS

| | | |
|---|---|---|
| 1326717 | 2/1994 | Canada . |
| 0004167 | 9/1979 | European Pat. Off. . |
| 0079281 | 5/1983 | European Pat. Off. . |
| 0362596 | 4/1990 | European Pat. Off. . |
| 0418701 | 3/1991 | European Pat. Off. . |
| 2294517 | 7/1976 | France . |
| 2584228 | 1/1987 | France . |
| 2340548 | 2/1975 | Germany . |
| 2521269 | 11/1976 | Germany . |
| 2606469 | 9/1977 | Germany . |
| 2820887 | 1/1979 | Germany . |
| 2809466 | 9/1979 | Germany . |
| 2459150 | 7/1980 | Germany . |
| 3228422 | 2/1984 | Germany . |
| 3622062 | 3/1987 | Germany . |
| 1480765 | 7/1977 | United Kingdom . |
| 1525020 | 9/1978 | United Kingdom . |
| 910067 | 11/1982 | U.S.S.R. . |

OTHER PUBLICATIONS

Nuclear Engineering Int. Publ. Apr. 1991, pp. 49–51, "CAREM aims to make very-low-power reactors economic".

*Primary Examiner*—Daniel D. Wasil
*Attorney, Agent, or Firm*—Herbert L. Lerner; Laurence A. Greenberg

[57] ABSTRACT

A pressurized water reactor residual heat extraction system uses the secondary cooling circuit to extract the residual heat in certain operating and malfunction conditions. A steam generator (D1) has a connection, located on the live-steam and feed-water side, to the secondary circuit side of a safety condenser (SK1). The tertiary circuit side of the safety condenser is fed from a water reservoir (B) located at a physically higher level. The steam generated is vented to the atmosphere through a blow-off line (b2) which may include a separator. A make-up feed device (E1) is connected to the secondary side of the steam generator. Because of the higher location of the safety condenser with respect to the steam generator, the heat energy in the secondary cooling circuit circulates by natural circulation.

26 Claims, 7 Drawing Sheets

SECONDARY-SIDE RESIDUAL-HEAT REMOVAL SYSTEM FOR PRESSURIZED-WATER NUCLEAR REACTORS

This application is a Continuation of International Application Ser. No. PCT/DE92/00664, filed Aug. 11, 1992.

BACKGROUND OF THE INVENTION

1. Field of the Invention

The invention relates to a secondary-side residual-heat removal system for a pressurized-water reactor, including:
- a) a steam generator which is connected into a primary loop of the nuclear reactor by the primary side of its heat-exchanging tubes,
- b) a safety condenser to one side of which the secondary side of the steam generator is connected through circuit lines,
- c) a water reservoir having a cooling medium which serves for cooling the other side of the safety condenser (tertiary side), wherein the other side of the safety condenser is provided with means for steam removal, and
- d) the safety condenser is disposed above the steam generator at such a level that a natural circulation is obtained in residual-heat removal operation through the circuit lines.

After shutting down nuclear reactors, so-called residual heat, which is also referred to as decay heat, occurs in all cases of operation and malfunction. In the case of pressurized-water nuclear reactors, the secondary side is used, at least in the initial phase, for the removal of the residual heat, in virtually all cases of operation and malfunction. That takes place by feeding the steam generators with feed water and by discharging energy directly or indirectly into the atmosphere, wherein the energy is transferred in the steam generator from its primary side to the secondary side through its tube bundle.

In order to keep malfunctions under control, a previously known concept for secondary-side residual-heat removal in the installations of pressurized-water nuclear reactors provides an emergency feeding system on the secondary-side feeding side of the steam generators and a steam blow-off device with a blow-control and safety valve on the discharge side. That is disclosed, for example, by German Published, Prosecuted Application DE 24 59 150, corresponding to Published British Application No. 1,525,020 (1); or by Published European Application No. 0 004 167 A3, corresponding to U.S. Pat. No. 4,304,198 (2). In reference (1) it is shown that the respective heat generator is connected by its secondary side not only to its operational feed-water and live-steam lines but also through emergency cooling circuit lines with a condensate recirculation pump to one side of a safety condenser. That safety condenser, which is referred to therein as a residual-heat removal heat exchanger and is equipped with additional condensate cooling means, may be replaced, if appropriate, by a water pool basin. Such a basin is shown in reference (2) and it serves for the blowing off of the secondary-side steam to be cooled, with the water pool being cooled by heat-exchanging tubes which are connected to a cooling circuit. The secondary-side steam is cooled and condensed by blowing off into the water pool. The condensate is recirculated by means of a condensate recirculation pump of the secondary side of the steam generator, i.e. its feed-water space.

Published French Application No. 2 584 228 (3), corresponding to U.S. Pat. No. 4,765,946 (3a), discloses a secondary-side residual-heat removal system for a pressurized-water reactor in which a steam generator, a safety condenser connected to the latter and a water reservoir for the safety condenser are provided. The safety condenser in that case is disposed above the steam generator at such a level that, in residual-heat removal operation, a natural circulation in the circuit lines between the steam generator and the safety condenser is obtained. However, in the case of that known residual-heat removal system, which is referred to as a safety cooling device, the water reservoir is disposed underneath the safety condenser and underneath the steam generator. In order to ensure that the demineralized water can be delivered from the water reservoir into the safety condenser, pressurization and pressure control are used.

Figure 1:
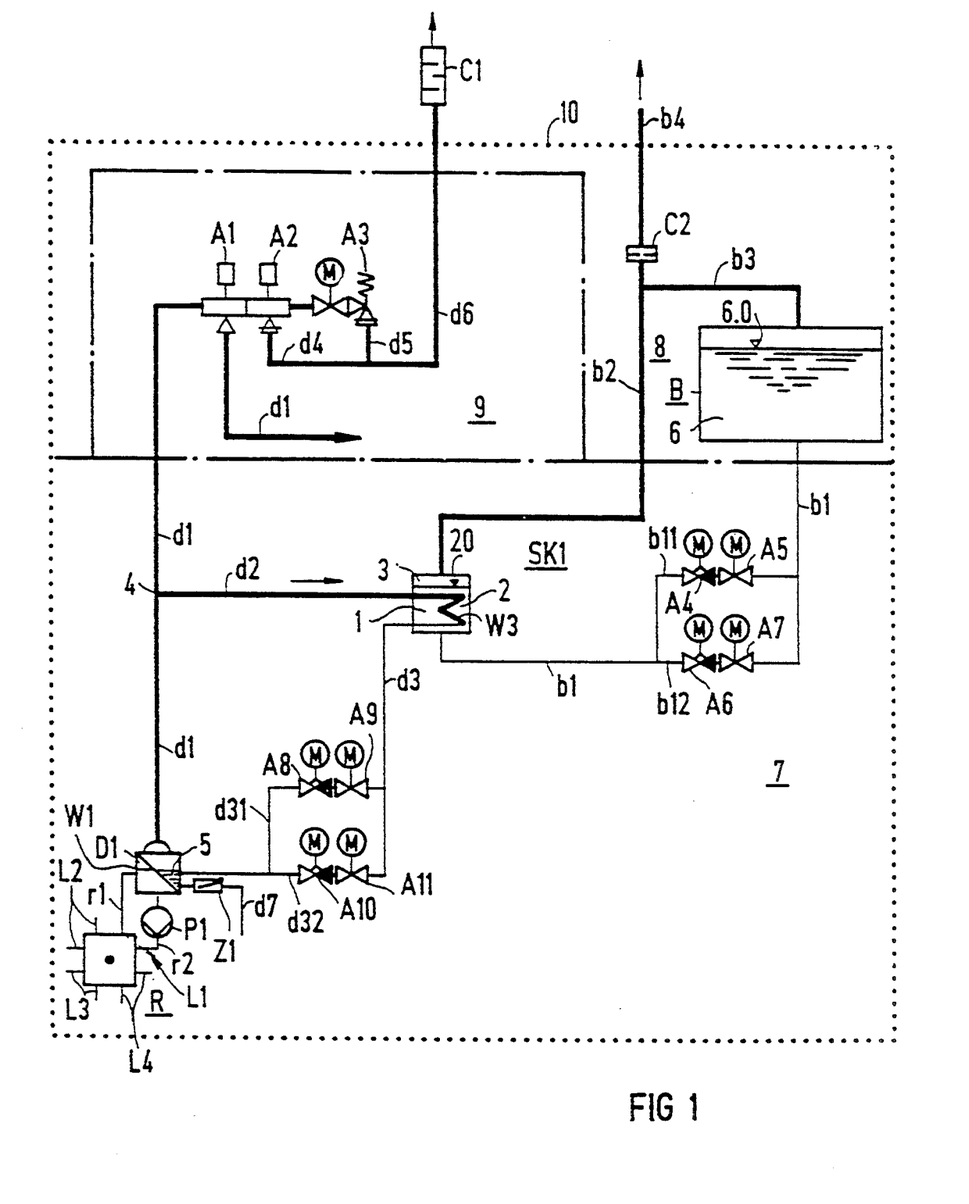
FIG. 1 is a schematic circuit diagram of a first embodiment of a secondary-side residual-heat removal system according to the invention with a single safety condenser.
Figure 2:
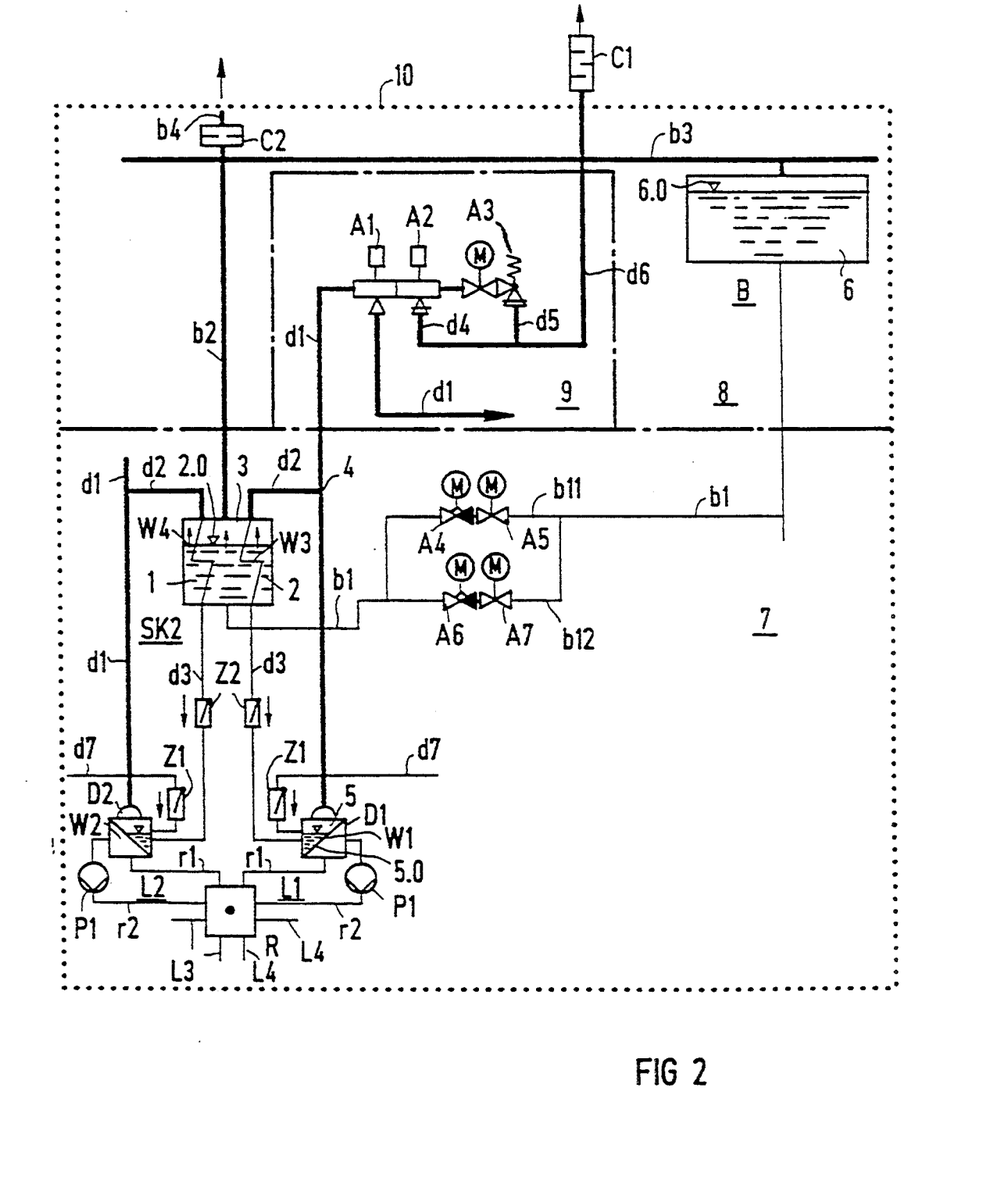
FIG. 2 is a circuit diagram of a second example of a secondary-side residual-heat removal system according to the invention with a double safety condenser.

As prior art, reference should also be made to Published European Application No. 0 418 701 A1 (4), relating to a system for the removal of decay heat from the core of a pressurized-water reactor. Although in that document a high-level tank is represented in FIGS. 1 and 2, in the case of that known system neither a safety condenser nor a make-up feed device for the secondary circuit is provided.

SUMMARY OF THE INVENTION

It is accordingly an object of the invention to provide a secondary-side residual-heat removal system for pressurized-water nuclear reactors, which overcomes the hereinafore-mentioned disadvantages of the heretofore-known devices of this general type, and in which a secondary-side safety condenser circuit is constructed in such a way that the switching on of pumps or analogous means for pressurization and pressure control is not required for putting the residual-heat removal by the safety condenser into operation. In addition thereto, the safety of the residual-heat removal system according to the invention is to be improved by providing a device for replenishing the secondary medium of the steam generator or of the safety condenser.

With the foregoing and other objects in view there is provided, in accordance with the invention, in a nuclear power plant having a pressurized-water nuclear reactor with a primary loop, a secondary-side residual-heat removal system for the nuclear reactor, comprising:
- a) a steam generator having heat-exchanging tubes with primary and secondary sides, the primary side of the heat-exchanging tubes being connected into the primary loop of the nuclear reactor;
- b) a safety condenser having two sides, circuit lines connecting one of the sides of the safety condenser to the secondary side of the steam generator;
- c) a water reservoir for receiving a cooling medium for cooling the other of the sides of the safety condenser, the other of the sides of the safety condenser having means for steam removal;
- d) the safety condenser being disposed relative to the steam generator at such a level that a natural circulation is obtained during residual-heat removal operation through the circuit lines;
- e) a make-up feed device for the secondary side of the steam generator, including a make-up feed tank, in particular for demineralized water, and associated connecting, pressure-relieving and replenishing lines as well as pressure-relieving and shut-off valves.

The advantages which can be achieved with the invention are to be seen in particular in that the intrinsic safety of the residual-heat removal system and its safety condenser are improved. This includes on one hand the geodetically higher configuration of the water reservoir in comparison with the safety condenser or, in the case of the structural union of the water reservoir with the safety condenser, the geodetically higher configuration of the water supply in comparison with the steam generator. Furthermore, it includes safety from loss of secondary medium from the secondary circuit due to the make-up feed device.

Except in the text of the claims, the abbreviation "SACO" will be used below for the term "safety condenser".

In the case of the residual-heat removal system according to the invention, in order to provide natural circulation it is sufficient for the distance between the two water-column levels of the safety condenser (condensate collector) and the steam generator to be on the order of magnitude of about 2 m.

In accordance with an added feature of the invention, the make-up feed tank contains demineralized water.

In accordance with another feature of the invention, in the case of the make-up feed device, a first connecting line is laid from a water pool of the make-up feed tank to a condensate-side leg and a second connecting line is laid as a pressure-equalizing line with an isolating valve from a steam-side leg of the circuit lines of the steam generator to a steam-cushion space of the make-up feed tank.

In accordance with a further feature of the invention, the make-up feed tank is disposed at least at the geodetic level of the safety condenser.

In accordance with an added feature of the invention, the water reservoir is disposed in an area outside the containment, which is protected against external effects, for example in a bunker extension constructed in the manner of a valve chamber, and in addition the safety condenser may also be disposed in this bunker extension.

In accordance with further features of the invention, the safety condenser is disposed inside the containment, above the steam generator, or alongside the respective steam generator, geodetically higher because of the natural circulation.

In accordance with yet another feature of the invention, there are provided shut-off and control valves on the secondary side of the steam generator or one side of the safety condenser and/or shut-off and control valves on the tertiary side or the other side of the safety condenser, for controlling the cooling capacity. This is done in order to ensure that the water level of the tertiary cooling medium (demineralized water from the water reservoir) cannot fall below a minimum water level or rise above a maximum water level, for optimum cooling in the safety condenser.

In accordance with yet a further feature of the invention, there are provided shut-off and control valves in tertiary-side feed lines of the safety condenser for controlling its cooling capacity by controlling the rate of the inflowing tertiary medium.

In accordance with yet an added feature of the invention, there are provided shut-off and control valves being inserted in an inflow-side leg of the circuit lines of the steam generator for controlling the cooling capacity of the safety condenser by controlling the rate of the condensate flowing back into the steam generator, and shut-off and control valves in the tertiary-side feed lines of the condenser for controlling the filling level of the tertiary medium in the safety condenser.

In accordance with yet an additional feature of the invention, the safety condenser is constructed as a submerged-evaporator steam regenerator, preferably of horizontal construction.

In accordance with again another feature of the invention, there is provided another steam generator having heat-exchanging tubes with primary and secondary sides, the safety condenser having at least two heat-exchanging systems disposed inside the safety condenser, each of the heat-exchanging systems being connected to the secondary side of a respective one of the steam generators.

In accordance with again a further feature of the invention, the safety condenser in the horizontal construction includes two separate tube bundles for the secondary medium to be condensed, which follow each other in the longitudinal direction of the submerged-evaporator housing. This is a compact way of realizing the embodiment with two steam generators and two two heat-exchanging systems.

In accordance with again an added feature of the invention, the safety condenser is constructed as a recirculation-evaporator steam generator, preferably of vertical construction.

In accordance with again an additional feature of the invention, the compact construction is achieved by the safety condenser being integral with the water reservoir, i.e. the latter accommodates at least one heat-exchanging system of a safety condenser inside it.

In accordance with yet an additional feature of the invention, the safety condenser is constructed as a single-pass evaporator (vertical construction) which is a very favorable compact construction that is of advantage for a configuration inside the containment.

In accordance with yet another feature of the invention, the safety condenser is disposed alongside the respective steam generator, geodetically higher because of the natural circulation.

In accordance with yet an added feature of the invention, the residual-heat removal system includes a containment and the safety condenser is disposed inside the containment or it is structurally united with the safety condenser.

In accordance with a concomitant feature of the invention, the water reservoir is disposed above the safety condenser.

Other features which are considered as characteristic for the invention are set forth in the appended claims.

Although the invention is illustrated and described herein as embodied in a secondary-side residual-heat removal system for pressurized-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawing in detail and first, particularly, to FIG. 1 thereof, there is seen a nuclear reactor R of four-loop construction, of which only one loop L1 is shown in any greater detail and remaining loops L2, L3, L4 are merely indicated. The nuclear reactor R has a respective primary loop with a hot primary coolant leg r1 leading to a tube bundle W1 of a steam generator D1. In each case a so-called cold leg r2 leads from the tube bundle W1 of the steam generator D1 through a primary coolant pump P1, back to an inlet-side pipe nozzle of the nuclear reactor R, which is a pressurized-water nuclear reactor. Only a secondary-side residual-heat removal system of the steam generator D1 is described in any more detail below.

On the steam side, a live-steam line d1 is connected to the steam generator D1 and leads to a live-steam valve A1. A further part of the live-steam line d1 leads to a turbine from an outlet of the live-steam valve A1. The turbine, a quick-closing valve thereof and a control valve thereof as well as further components and pipelines of the heating circuit are not shown, because they are not required for an understanding of the invention. Two pressure-dependently operable safety valves A2 and A3 that are respectively constructed for 100% and 15% of a nominal blowing-off capacity, blow off over the roof through respective blowing-off lines d4 and d5 and a common blowing-off line d6, as well as through a silencer C1, when there is an excess pressure in the live-steam line reaching a response pressure.

In normal operation, the steam generator D1 receives feed water through a non-illustrated main feed-water pump and a feed-water line d7 as well as a non-return valve Z1. If the live-steam valve A1 is shut off in the event of a malfunction, for example a heating tube leak in the steam generator D1, the secondary-side residual-heat removal system according to the invention goes into action. The shutting-off of the valve A1 is effected automatically if an increase in activity reaching a limit value is established by activity-measuring devices in the secondary circuit. This secondary-side residual-heat removal system includes a safety condenser SK1 with a tube bundle W3. The safety condenser SK1 in this case has a tank 1, which is filled with a water pool 2 up to a level 2.0, defining a steam-gas space 3 above the level 2.0. The tube bundle W3 is substantially submerged in the water pool 2. Safety condenser or SACO circuit lines of the safety condenser SK1 include a hot or steam-side leg, which is formed by a first section of the live-steam line d1, reaching as far as a branching point 4, and by a line part d2, which leads as far as an inlet of the tube bundle W3. A cold or condensate-side leg of the SACO circuit lines is formed by a line part d3, which opens out from an outlet of the tube bundle W3, preferably through a control and shut-off valve station A9–A11, into a feed-water space 5 of the steam generator D1.

A tertiary feed line b1, which preferably opens out into a bottom region of the tank or jacket space 1 of the safety condenser SK1, has an inlet side connected to the bottom of a water reservoir B, which preferably contains a demineralized water pool 6 up to a level 6.0. The water reservoir B is disposed in a secured area 8 outside a containment 7 at a geodetically higher level than the safety condenser SK1. The secured area 8 may be formed, for example, by a bunker extension on the containment 7. A valve chamber 9 is also accommodated in such a bunker extension. The two chamber spaces 8 and 9 as well as the partially represented space of the containment 7 are emphasized by dotted or dashed-dotted lines. A tertiary blowing-off line b2 leads from the steam space 3 of the safety condenser SK1 and in the present case leads through a throttling point C2 to an outer part b4 of the blowing-off line. An outer dotted line 10 indicates that a line b3 and the throttling point C2 are furthermore accommodated in the two chambers 8 and 9, in an area that is protected against external effects. The line b3 is a pressure-equalizing line, by means of which a limited pressure is impressed on the water reservoir B. Since the illustrated residual-heat removal system belongs to a four-loop installation of a pressurized-water nuclear power plant, at least one further water reservoir is also provided, in which case the line b3 would lead to the non-illustrated water reservoirs and further blowing-off lines.

The tertiary-side feed line b1 includes two line branches b11 and b12, each having a series connection of motor-operable shut-off valve and a control valve A4, A5 and A6, A7, respectively. In this way a control of the filling level takes place for the safety condenser SK1 (on the tertiary side), by feeding only as much cooling water from the water reservoir B into the safety condenser SK1 as is necessary to ensure that the water level 2.0 can fluctuate only within predetermined limits, so that the proper cooling function for the secondary medium circulating through the tube bundle W3 in natural circulation is ensured. In addition to the shut-off and control valves A4 to A7 in the line branches b11, b12, which serve for controlling the filling level of the tertiary medium in the safety condenser SK1, further shut-off and control valves A8, A9 in a line branch d31 and A10, All in a line branch d32 are connected into the inflow-side (cold) leg d3 of the SACO circuit lines d1 to d3 of the steam generator D1 for the purpose of controlling the cooling capacity of the safety condenser. In a way which is similar to the two line branches b11, b12, the parallel line branches with their valves serve for increasing redundancy.

The illustrative embodiment according to FIG. 2 differs from that according to FIG. 1 in that a safety condenser SK2 on the secondary side contains two separate tube bundles W3 and W4, which are each assigned to a respective steam generator D1 and D2.

Furthermore, the shut-off and control valves A4 - A7 are provided in the tertiary-side feed lines b1, b11, b12 of the safety condenser SK2 for controlling the cooling capacity of the latter by means of controlling the rate of the inflowing tertiary medium 6.

Figure 3:
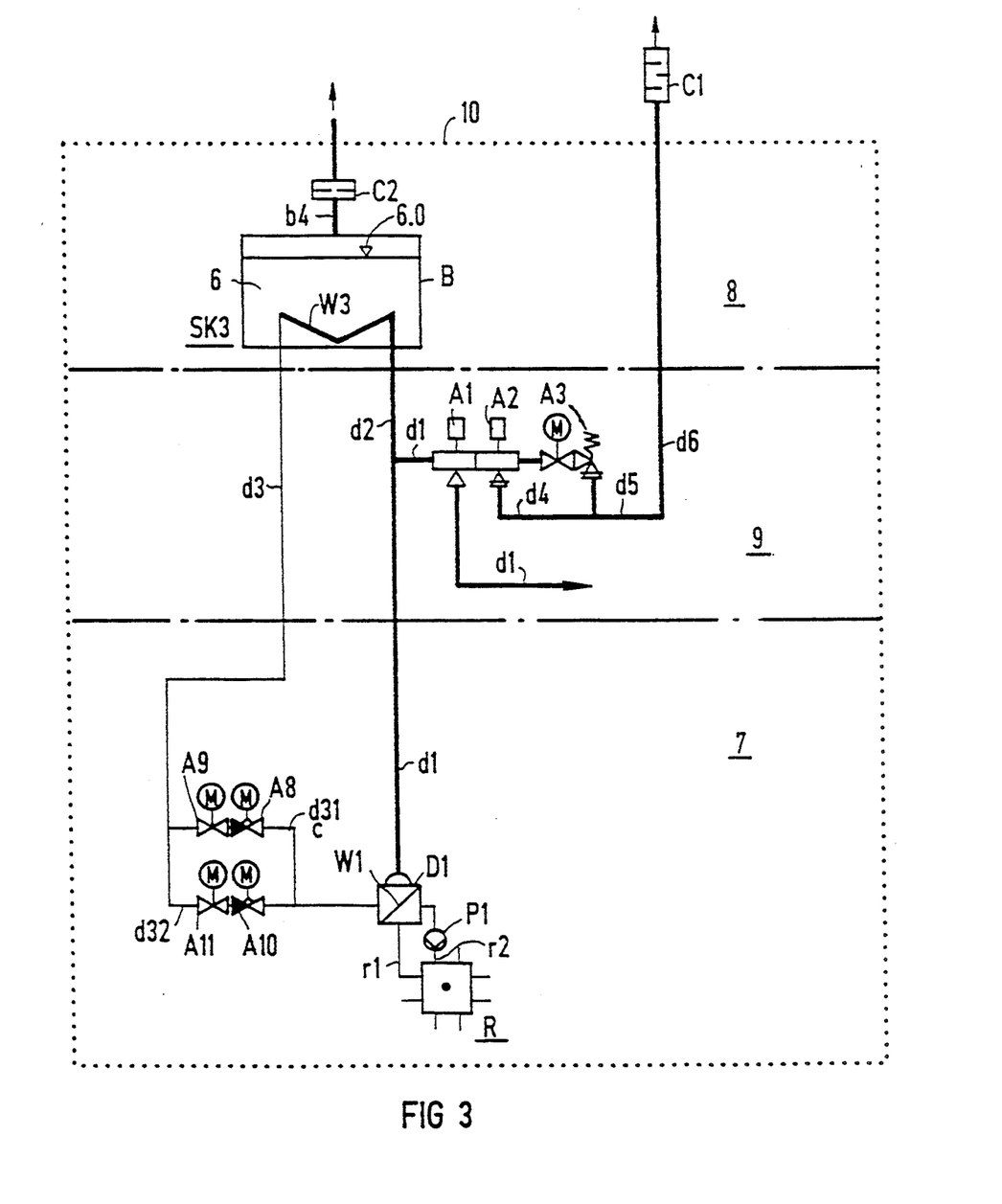
FIG. 3 is a circuit diagram of a third illustrative embodiment with a safety condenser which is integral with a water reservoir.

The circuit according to FIG. 3 differs from that according to FIG. 1 in that the water reservoir B at the same time forms a safety condenser SK3 and for that purpose accommodates at least one heat-exchanging system or tube bundle W3 of the safety condenser inside it. In other words, the water reservoir B and the safety condenser SK3 form a structural unit. Controlling the capacity again takes place on the secondary side by means of the two valve combinations A8/A9 and A10/A11. Controlling the filling level in the water reservoir B is not required in the case of this embodiment of the circuit.

Figure 4:
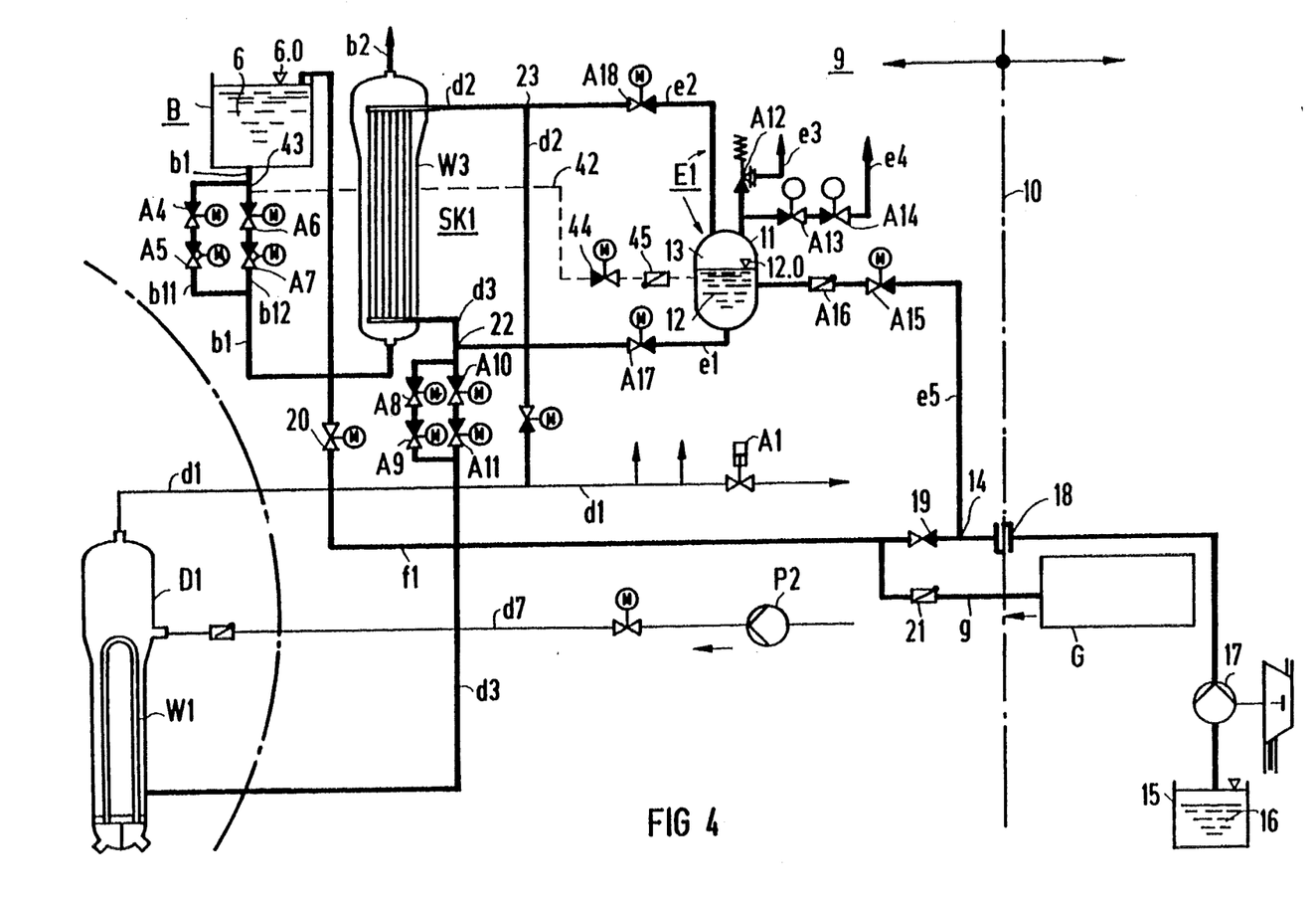
FIG. 4 is a somewhat more detailed schematic and diagrammatic view of an illustrative embodiment according to FIG. 1 with a make-up feed device assigned to the secondary side of the residual-heat removal system.

In comparison with the circuit according to FIG. 1, with which it coincides in the basic connection of the residual-heat removal system, the circuit according to FIG. 4 has a special feature which is that a make-up feed or replenishing device E1 is provided for the secondary side of the steam generator D1. The device E1 includes a make-up feed tank 11 which has a water pool 12, that is preferably of demineralized water, and a steam cushion 13 located above the water pool 12, associated connecting lines e1, e2 with isolating valves A17, A18, a pressure-relieving line e4 with relieving valves A13, A14, a pressure-protecting line e3 with a safety valve A12 and a replenishing line e5 in which a motor-operated valve A15 and a non-return valve A16 are disposed in a series connection. Furthermore, a main replenishing line f1 is connected to the replenishing line e5 of the make-up feed tank 11 at a connecting point 14. An extinguishing-water basin 15 that is located outside the protected area 9 and has a water filling 16, serves the purpose of delivering or feeding into the water reservoir B by means of a (mobile) fire-extinguishing pump 17, the main replenishing line f1, a coupling 18, a shut-off valve 19, as well as a further motor-driven shut-off valve 20. It may also serve the purpose of delivering or feeding extinguishing or drinking water into the make-up feed tank 11 through the connecting or branching point 14 and through the replenishing line e5. FIG. 4 shows a dashed connecting line 42, which leads from the line b1 at a connecting point 43, through a motorized valve 44 and a non-return valve 45 into the water pool 12 of the make-up feed tank 11. Since the water reservoir B lies at a geodetically higher level than the make-up feed tank 11 (the latter is disposed at least at the geodetic level of the safety condenser SK1), when the valve (motorized valve) 44 is open, if need be water can be fed out of the water pool 6 of the water reservoir into the make-up feed tank 11. Operational replenishment of water takes place by feeding demineralized water from a water treatment installation G through a line g with a non-return valve 21 into the main replenishing line f1 and from there either into the water reservoir B (with the valve 20 open and the valve 19 closed) or into the make-up feed tank 11 with the valve 20 closed and valves 19 and A15 open. A pump which belongs to the water treatment system G and overcomes the required delivery head is not shown.

The line e1 with the isolating valve A17 is a connecting line which leads from the water pool 12 of the make-up feed tank 11 to the condensate-side leg d3 of the SACO circuit lines d1 to d3 of the steam generator D1 at a connecting point 22. The line e2 is a pressure-equalizing line, which is connected through the isolating valve A18 from the pressure-side leg d2 of the SACO circuit lines to the steam cushion space 13 at a connecting point 23, wherein the level of the water pool 12 is denoted by reference numeral 12.0.

Starting from a filled, pressureless make-up feed tank 11, feeding into the (secondary-side) SACO circuit d1 to d3 takes place by pressurizing the make-up feed tank 11 through the steam-side connection e2 having the isolating valve A18 and by opening the isolating valve A17 of the condensate-side connecting line e1. In this filling phase, if the filling level in the steam generator D1 is too low, it can be adequately raised again. After isolation of the make-up feed tank 11 from the SACO circuit, the make-up feed tank 11 can be pressure-relieved again (through the valves A13 and A14) and replenished, as already described. Replenishing may also be performed from a non-illustrated drinking water system.

Attention is drawn to the following particular advantages of the make-up feed device E1:

a) With the aid of the make-up feed device E1, even an already exhausted steam generator D1, of which the secondary circuit can be shut off, can be made usable again for heat removal.

b) The make-up feed device E1 increases the reliability of the passive secondary-side residual-heat removal system, since it acts in an inventory or storage-preserving manner, in addition to the tight shutting off of the secondary circuit.

Figure 5:
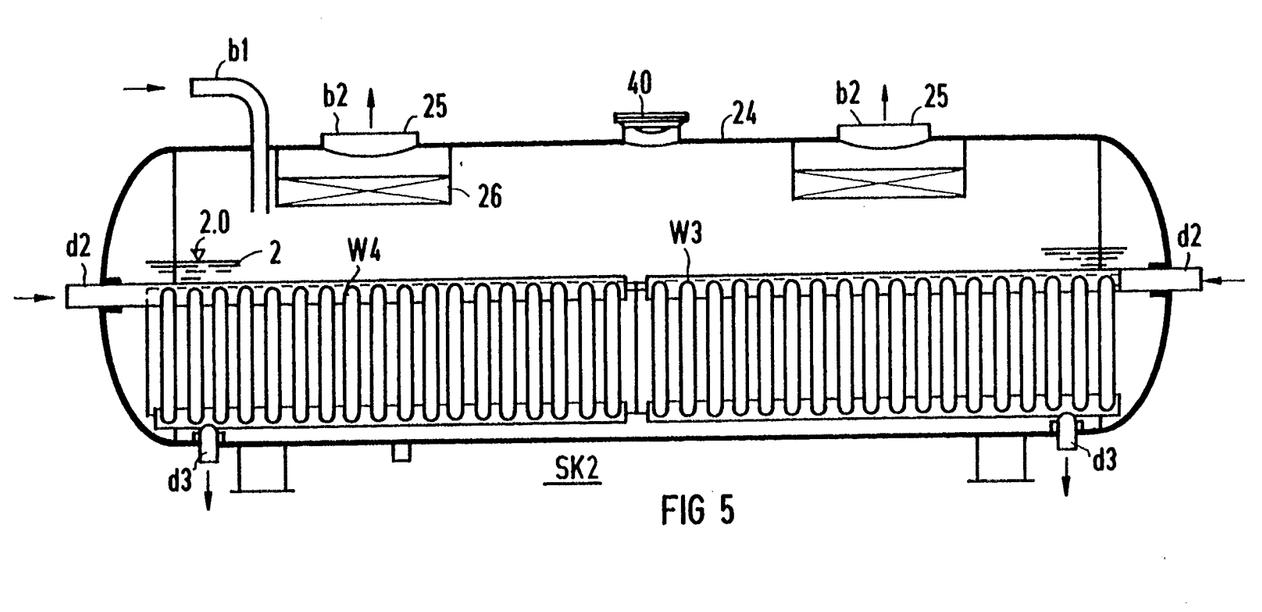
FIG. 5 is an elevational view of a submerged-evaporator steam regenerator in duplex construction, which may be used for a double safety condenser according to FIG. 2.

FIG. 5 shows an illustrative embodiment of the duplex safety condenser SK2 according to FIG. 2 in the form of a submerged-evaporator steam regenerator with a horizontal construction, which contains two separate tube bundles W3, W4 for the secondary medium to be condensed, that follow each other in the longitudinal direction of an approximately hollow-cylindrical submerged-evaporator housing 24. Condensate or steam-moisture separators 26 are connected upstream of two vapor outlets 25, which change over into the blowing-off lines b2.

Figure 6:
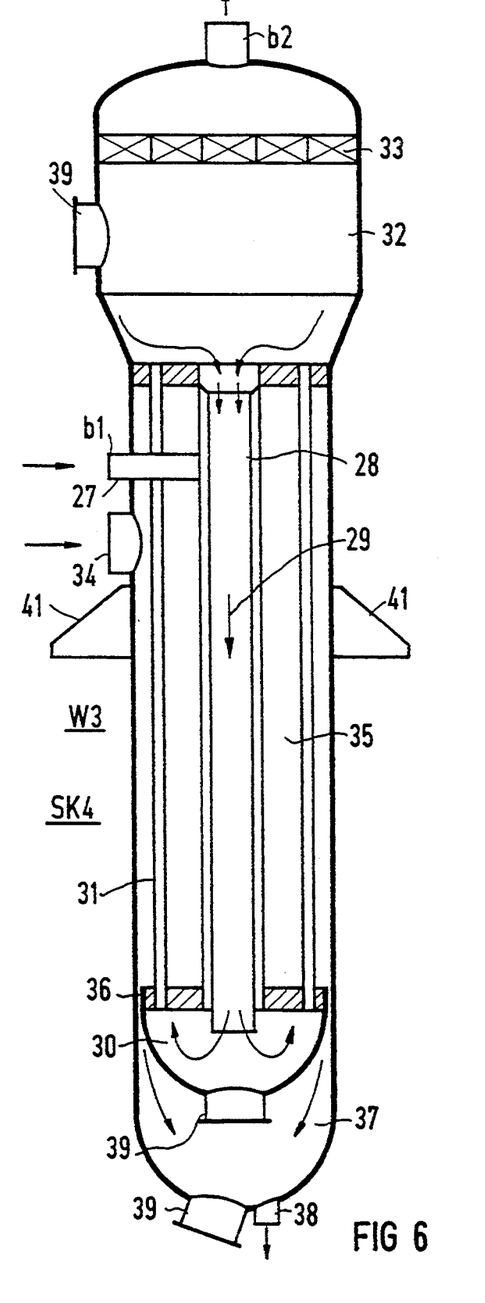
FIG. 6 is an elevational view of a recirculation-evaporator steam regenerator for vertical construction, which may be used for a single safety condenser, for example for the one schematically represented in FIG. 1 or in FIG. 4.

FIG. 6 shows a modification of the safety condenser SK2 according to FIGS. 2 or 4 in the form of a recirculation-evaporator steam regenerator SK4 with a vertical construction. A connecting nozzle 27 belongs to the water feed line b1 and opens out into a central tube 28, from which water passes into a water chamber 30 according to the direction of an arrow 29. From there, the water rises upward through remaining tubes 31 of the tube bundle W3 and evaporates as it does so. After passing a water separator 33, steam rising in a wet-steam space 32 passes to a vapor outlet of the blowing-off line b2. Reference numeral 34 indicates a nozzle for a heating-steam inlet, which is connected to the line d2 shown in FIG. 1. Steam condensing in a heating-steam space 35 by heat exchange with the tube bundle W3 runs off downward and passes through an annular gap 36 into a condensate chamber 37 and through a connecting nozzle 38 into the condensate line d3 shown in FIG. 1. Reference numeral 39 denotes manhole nozzles, through which the chambers 30, 32 and 37 are accessible. A corresponding manhole nozzle is also represented in FIG. 5 and denoted there by reference numeral 40. Reference numeral 41 represents carrying claws for the vertical mounting of the safety condenser SK4.

Figure 7:
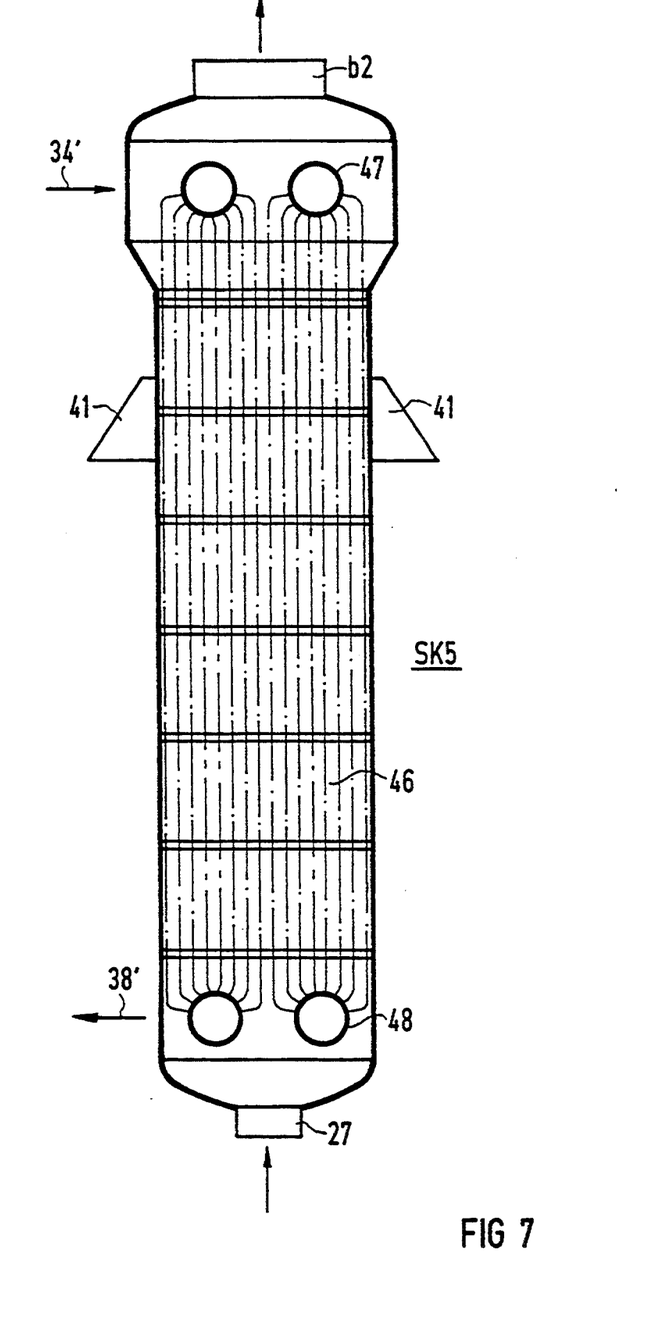
FIG. 7 is a view similar to FIG. 6 of a single-pass steam regenerator as a safety condenser.

FIG. 7 shows a safety condenser SK5 in the form of a single-pass steam regenerator. This SACO could be used in the examples according to FIGS. 1 and 4 for the SACO SK1. The same parts as in FIG. 6 bear the same reference numerals. A tube bundle 46 extends between an upper collector ring 47 and a lower collector ring 48. Heating steam is fed to the upper collector ring 47 in the direction of an arrow 34′ and leaves the tube bundle 46 as condensate through the lower collector ring 48 and a diagrammatically illustrated condensate outlet 38′. Cooling water enters through a lower nozzle 27 and heats up more and more as it rises, until it evaporates in the upper region of the tube bundle 46 and leaves the SACO SK5 as wet steam through a nozzle leading to the line b2.

Residual-heat removal operation is initiated in the case of the circuits according to FIGS. 1 to 4 by suitable signals. In the case of the circuit according to FIG. 2, the natural circulation can then begin immediately through elements d1-d2-W3-d3-W1. Controlling the capacity of the residual-heat removal takes place on the tertiary side by opening the shut-off and control valves A4/A5 and A6/A7 and setting them in dependence on the filling level. In the case of the circuits according to FIG. 1 and FIGS. 3, 4 under given preconditions (the reactor R shutdown, the valve A1 closed, the pumps P1 or P2 shut off), in order to put the natural circulation into operation, the valves A8/A9 and/or A10/A11 must first of all be opened and, for the purpose of replenishing the tertiary medium, the valves A4/A5 and/or A6/A7 must also be opened. In the case of the circuit according to FIG. 1, controlling the filling level then takes place on the tertiary side and controlling the capacity takes place on the secondary side, as also occurs in the case of the example according to FIG. 3. In the case of the example according to FIG. 4, controlling the capacity takes place on the tertiary side.

The systems according to FIGS. 1 to 4 are constructed in such a way that residual-heat removal operation of preferably at least 24 hours is made possible.

We claim:

1. In a nuclear power plant having a pressurized-water nuclear reactor with a primary loop, a secondary-side residual-heat removal system for the nuclear reactor, comprising:
    a) a steam generator having heat-exchanging tubes with primary and secondary sides, said primary side of said heat-exchanging tubes being connected into the primary loop of the nuclear reactor;
    b) a safety condenser having two sides, circuit lines connecting one of said sides of said safety condenser to said secondary side of said steam generator;
    c) a water reservoir for receiving a cooling medium for cooling the other of said sides of said safety condenser, the other of said sides of said safety condenser having means for steam removal;
    d) said safety condenser being disposed relative to said steam generator at such a level that a natural circulation is obtained during residual-heat removal operation through said circuit lines; and
    e) a make-up feed device for said secondary side of said steam generator, said make-up feed device having a make-up feed tank and associated connecting, pressure-relieving and replenishing lines as well as pressure-relieving and shut-off valves.

2. The residual-heat removal system according to claim 1, wherein said water reservoir is disposed above said safety condenser.

3. The residual-heat removal system according to claim 1, wherein said water reservoir is structurally united with said safety condenser.

4. The residual-heat removal system according to claim 1, wherein said make-up feed tank contains demineralized water.

5. The residual-heat removal system according to claim 1, wherein said make-up feed tank has a water pool and a steam-cushion space, said circuit lines include a condensate-side leg and a steam-side leg, and said connecting lines include a first connecting line connected from said water pool to said condensate-side leg, and a second connecting line having an isolating valve and being connected as a pressure-equalizing line from said steam-side leg to said steam-cushion space.

6. The residual-heat removal system according to claim 1, wherein said make-up feed tank is disposed at least at the geodetic level of said safety condenser.

7. The residual-heat removal system according to claim 1, including another steam generator having heat-exchanging tubes with primary and secondary sides, said safety condenser having at least two heat-exchanging systems disposed inside said safety condenser, each of said heat-exchanging systems being connected to said secondary side of a respective one of said steam generators.

8. The residual-heat removal system according to claim 1, wherein said safety condenser has at least one heat-exchanging system disposed inside said water reservoir.

9. The residual-heat removal system according to claim 1, including a containment, and a building being disposed outside said containment and being protected against external effects, said water reservoir being disposed in said building.

10. The residual-heat removal system according to claim 9, wherein said building is a bunker extension being constructed in the form of a valve chamber.

11. The residual-heat removal system according to claim 1, wherein said safety condenser is a submerged-evaporator steam regenerator.

12. The residual-heat removal system according to claim 11, wherein said safety condenser is horizontally constructed.

13. The residual-heat removal system according to claim 1, wherein said safety condenser is a recirculation-evaporator steam regenerator.

14. The residual-heat removal system according to claim 13, wherein said safety condenser is vertically constructed.

15. The residual-heat removal system according to claim 1, wherein said safety condenser is a single-pass steam regenerator.

16. The residual-heat removal system according to claim 15, wherein said safety condenser is vertically constructed.

17. The residual-heat removal system according to claim 7, wherein said safety condenser is a submerged-evaporator steam regenerator with a horizontal construction and a submerged-evaporator housing, and said at least two heat-exchanging systems are two separate tube bundles for secondary medium to be condensed, said tube bundles following each other in longitudinal direction of said submerged-evaporator housing.

18. The residual-heat removal system according to claim 1, including shut-off and control valves disposed on said secondary side of said steam generator.

19. The residual-heat removal system according to claim 1, including shut-off and control valves disposed on one of said sides of said safety condenser, and shut-off and control valves disposed on the other of said sides of said safety condenser for cooling capacity control.

20. The residual-heat removal system according to claim 1, wherein said safety condenser has a tertiary side, and including shut-off and control valves disposed on one of said sides of said safety condenser and shut-off and control valves disposed on said tertiary side of said safety condenser for cooling capacity control.

21. The residual-heat removal system according to claim 1, including shut-off and control valves disposed on the other of said sides of said safety condenser for cooling capacity control.

22. The residual-heat removal system according to claim 1, wherein said safety condenser has a tertiary side, and including shut-off and control valves disposed on said tertiary side of said safety condenser for cooling capacity control.

23. The residual-heat removal system according to claim 1, wherein said safety condenser has a tertiary side with feed lines, and including shut-off and control valves connected in said tertiary-side feed lines for providing cooling capacity control by controlling a rate of inflowing tertiary medium.

24. The residual-heat removal system according to claim 1, wherein said circuit lines include an inflow-side leg, and said safety condenser has a tertiary side with feed lines, and including shut-off and control valves in said inflow-side leg for controlling cooling capacity of said safety condenser by controlling a rate of condensate flowing back into said steam generator, and shut-off and control valves in said tertiary-side feed lines for filling level control of a tertiary medium in said safety condenser.

25. The residual-heat removal system according to claim 1, wherein the safety condenser is disposed alongside said respective steam generator, geometrically higher because of the natural circulation.

26. The residual-heat removal system according to claim 1, including a containment, said safety condenser being disposed inside said containment.

* * * * *